United States Patent [19]

Cohen et al.

[11] Patent Number: 4,861,842
[45] Date of Patent: Aug. 29, 1989

[54] CURE SYSTEM FOR SULFUR VULCANIZABLE RUBBER

[75] Inventors: Martin P. Cohen, Akron; Robert J. Brown, Cuyahoga Falls; Norbert Majerus, Akron, all of Ohio

[73] Assignee: The Goodyear Tire & Rubber Company, Akron, Ohio

[21] Appl. No.: 290,958

[22] Filed: Dec. 28, 1988

[51] Int. Cl.$^4$ .................... C08F 8/34; C08C 19/20
[52] U.S. Cl. .................... 525/329.3; 525/330.4; 525/331.1; 525/331.8; 525/332.7; 525/348; 525/349; 525/379
[58] Field of Search .................. 525/332.7, 332.6, 232, 525/332.8, 332.9, 330.4, 329.3, 331.8, 331.1

[56] References Cited

U.S. PATENT DOCUMENTS

| | | | |
|---|---|---|---|
| 2,390,036 | 11/1945 | Davis | 525/349 |
| 3,912,672 | 10/1975 | Morris | 525/379 |
| 3,919,179 | 11/1975 | Maxey | 525/331.8 |

FOREIGN PATENT DOCUMENTS

3387987/23-05  1/1983  U.S.S.R.

OTHER PUBLICATIONS

Derwent abstract JP 62-104855-A, Mitsui Petrochem Ind KK, 5/15/87.
Derwent abstract JP 59-227946-A, Osaka Soda KK, 12/21/84.
Derwent abstract SU 910684, Vakhnenko et al, 3/7/82.
OyCharov et al "Study of the Influence of Quaternary Ammonium Salts on the Properties of Compositions Based on SKI-3", 1983, pp. T/5-6.
Derwent abstract U.S. 4,602,052, Weber et al, 1986.
Derwent abstract U.S. 3,459,718, U.S. Rubber Co, 1968.
Derwent abstract U.S. 3,357,957, Imperial Chem Ind, 1968.
Derwent abstract U.S. 3,514,430, Scheele, 1970.
Derwent abstract U.S. 3,370,049, Nalco Chemical Co, 1968.
Derwent abstract SU 1260373, Dontsov et al, 1986.
Petry et al, "Temperature Dependence of the Cross Linking Rate in Vulcanization Accelerated by Cationic Tenside", 1967.
Scheele et al, "Vulcanization Accelerated with Zinc-Benzothiazyl-Mercaptide in the Presence of a Cation Soap", 1966.
Petry et al, "On the Knowledge of Vulcanization of Highly Elastic Polymerisates", 1966.

*Primary Examiner*—Christopher Henderson
*Attorney, Agent, or Firm*—Bruce J. Hendricks

[57] ABSTRACT

The present invention relates to a cure system for a sulfur vulcanizable rubber. The cure system comprises:
(a) from about 0.50 to about 2.0 phr of a sulfenamide accelerator selected from the group consisting of N-oxydiethylene benzothiazole-2 sulfenamide, N-cyclohexyl-2-benzothiazole sulfenamide, N-t-butyl-2-benzothiazole sulfenamide and N-oxydiethylene-thiocarbamyl-N'-oxydiethylene sulfenamide;
(b) from about 0.10 to about 1.0 phr of a guanidine accelerator selected from the group consisting of diphenyl guanidine and di-ortho-tolylguanidine;
(c) from about 0.10 to about 1.0 phr of a thiuram accelerator selected from the group consisting of tetraethyl thiuramdisulfide, tetramethyl thiuram monosulfide, tetramethyl thiuramdisulfide;
(d) from about 0.05 to about 1.0 phr of mercapto benzothiazyl disulfide;
(e) from about 0.75 to about 3.0 phr of a sulfur vulcanizing agent;
(f) from about 0.05 to about 0.50 phr of N-cyclohexylthio-phthalimide;
(g) from about 1.0 to about 5.0 phr of a zinc compound selected from the group consisting of zinc oxide and zinc stearate and;
(h) from about 0.05 to about 1.0 phr of an activator of the formula:

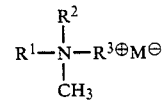

wherein $R^1$, $R^2$, and $R^3$ are independently alkyl radicals having 8 to 10 carbon atoms and M is selected from the group consisting of Cl, Br, $CH_3SO_4$ and $HSO_4$.

10 Claims, No Drawings

CURE SYSTEM FOR SULFUR VULCANIZABLE RUBBER

FIELD

This invention relates to a fast curing rubber compound particularly suitable for use in the preparation of injection molded articles.

BACKGROUND

Various rubbers are often mixed with curvatives such as sulfur and/or organic peroxides in order that they can under go vulcanization or curing. It is recognized that, if desired, various vulcanization accelerators can also be mixed with the rubber in order to speed up the curing of the rubber or, in other words, shorten the vulcanization time.

Some uncured rubber materials, or compounded rubber, can be used for injection molding various articles with suitable injection molding equipment. Such articles can include, for example, ring-shaped tire treads for the purpose of retreading worn tires, solid tires, flaps for tube type truck tires, motor mounts for various mounts and tank track pads.

Vulcanization, or curing, relates to a process where elastomers, natural and/or synthetic, are mixed with various materials which will cause the rubber to undergo a type of crosslinking effect upon application of heat. Various other materials are conventionally mixed with the rubber to help improve various properties such as strength, durability and the like. Such rubber mixture is often called compounded rubber. In general, the vulcanization step will effect various changes in raw, uncured elastomers such as increasing its tensile strength, eliminate tack, increase elasticity, elongation and hardness.

As hereinbelow set forth, the enhanced properties can be obtained by mixing the uncured elastomer with a curative such as, for example, sulfur in the presence of various accelerators. Conventionally, the presence of accelerators in the vulcanization process is desirable because they enable the vulcanization reaction to be carried out over a shorter period of time and, often, at a lower temperature.

The use of various vulcanization accelerators can present particular problems in the preparation of various molded articles. For example, accelerators can rapidly accelerate the vulcanization at conventional rubber processing temperatures so that the uncured elastomer can become partially or prematurely cured before the molding and curing step. The resultant "pre-partially vulcanized" rubber is sometimes termed "scorched rubber". In order to overcome this disadvantage, some types of accelerators are used which are known as "delayed action accelerators" in which their accelerator effect becomes evident only after the elastomer reaches an elevated tempeature range. Such accelerators thus tend to reduce or eliminate the aforesaid scorching problems. Additionally, a prevulcanization inhibitor may further be used to delay premature onset of vulcanization in processing especially through the injection molding step.

Even the use of such delayed action accelerators and prevulcanization inhibitors may not be sufficient to effectively reduce premature curing of elastomers for some purposes such as, for example, in some instances of injection molding operations.

Accordingly, advantageous rubber compounding technology is often sought for various purposes, such as for example, the preparation of rubber compounds which might be used for injection molding purposes.

When an unvulcanized elastomer is submitted to injection molding procedures, sufficient pressures are applied by suitable equipment to force the elastomer into a mold cavity with sufficient pressure to cause the elastomer to fill the mold. The elastomer composition is submitted to curing conditions in the mold such as elevated temperature and pressure in order to create a vulcanized article.

In the operation of the injection molding process, a strip of raw stock is fed into a heated cylinder where it is put under pressure by either a reciprocating ram or helical screw. The helical screw units masticate the stock as well as heat it, then move forward like a ram when the mold is charged. During the charging of the mold, the ram or ram screw forces the heated stock out of the cylinder through a nozzle into runners in the mold and through sprues into the cavities. The nozzle then disengages until the cure is complete and the mold is emptied and reclosed.

In the injection molding process, the stock has to travel a long distance through the runners and sprues in the mold. In these runners and sprues, the rubber compound is submitted to relatively high shear forces which cause substantial friction. This internal friction rapidly increases the temperature of the rubber compound. Very often the cure of the rubber starts before the compound reaches the mold. In such a case, the cured rubber clogs the runners and sprues and the injection process is interrupted. Due to the high heat generation of the stock, lower amounts of sulfur and accelerators have to be used. Due to the lower amount of curatives, the compound will, therefore, vulcanize at a slower rate. It is, therefore, desirable to overcome such injection molding difficulties for the purpose of injection molding of rubber to form molded articles therefrom.

SUMMARY OF THE INVENTION

There is diclosed a cure system for a sulfur vulcanizable rubber. The cure system comprises:

(a) from about 0.50 to about 2.0 phr of a sulfenamide accelerator selected from the group consisting of N-oxydiethylene benzothiazole-2 sulfenamide, N-cyclohexyl-2-benzothiazole sulfenamide, N-t-butyl-2-benzothiazole sulfenamide and N-oxydiethylene-thiocarbamyl-N'-oxydiethylene sulfenamide;

(b) from about 0.10 to about 1.0 phr of a guanidine accelerator selected from the group consisting of diphenyl guanidine and di-ortho-tolylguanidine;

(c) from about 0.10 to about 1.0 phr of a thiuram accelerator selected from the group consisting of tetraethyl thiuramdisulfide, tetramethyl thiuram monosulfide, and tetramethyl thiuramdisulfide;

(d) from about 0.05 to about 1.0 phr of mercapto benzothiazyl disulfide;

(e) from about 0.75 to about 3.0 phr of a sulfur vulcanizing agent;

(f) from about 0.05 to about 0.50 phr of N-cyclohexylthio-phthalimide;

(g) from about 1.0 to about 5.0 phr of a zinc compound selected from the group consisting of zinc oxide or zinc stearate; and (h) from about 0.05 to about 1.0 phr of an activator of the formula:

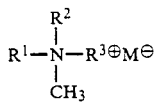

wherein $R^1$, $R^2$, and $R^3$ are independently alkyl radicals having 8 to 10 carbon atoms and M is selected from the group consisting of Cl, Br, $CH_3SO_4$ and $HSO_4$.

In addition, there is disclosed a sulfur vulcanizable rubber having a plasticity of 35 or less and containing the above-defined cure system and an elastomer having olefinic unsaturation.

DISCLOSURE AND PRACTICE OF THE INVENTION

In accordance with the invention, a vulcanizable rubber composition is provided which is comprised of rubber and, as a curing system, a sulfenamide accelerator, a guanidine accelerator, a thiuram accelerator, mercapto benzothiazyl disulfide, a sulfur vulcanizing agent, zinc compound, N-cyclohexylthio-phthalimide, and a methyl trialkyl ammonium salt.

In the practice of this invention, from about 0.50 to about 2.0 phr of a sulfenamide accelerator may be used. Preferably, the amount of sulfenamide accelerator ranges from about 0.75 to about 1.25 phr. Examples of sulfenamides which may be used include N-oxydiethylene benzothiazole-2 sulfenamide, N-cyclohexyl-2-benzothiazole sulfenamide, N-t-butyl-2-benzothiazole sulfenamide and N-oxydiethylene-thiocarbamyl-N'-oxydiethylene sulfenamide. The preferred sulfenamide is N-oxydiethylene benzothiazole-2 sulfenamide. These sulfenamides are generally known as a primary accelerator.

From about 0.10 to about 1.0 phr of a guanidine accelerator is used in the present invention. Preferably, from about 0.30 to about 0.80 phr of the guanidine accelerator is used. Examples of guanidines which can be used include diphenyl guanidine and di-ortho-tolyl-guanidine. The preferred guanidine is diphenyl guanidine. Guanidines are general known as a secondary accelerator.

The cure system of the present invention includes mercapto benzothiazyl disulfide. This accelerator is generally used in an amount ranging from about 0.50 phr to about 1.0 phr. Preferably, the amount ranges from about 0.75 to about 0.30 phr.

In addition to the above accelerators, a thiuram accelerator is used. Generally, the amount of thiuram accelerator ranges from about 0.10 to about 1.0 phr. Preferably, the amount of thiuram accelerator ranges from about 0.20 to about 0.75. Specific examples of thiuram mono- and disulfides that can be used include tetraethylthiuramdisulfide, tetramethylthiuram monosulfide and tetramethylthiuramdisulfide. A thiuram accelerator that is particularly useful in the present invention is tetramethylthiruamdisulfide.

The cure system of the present invention includes using, as an accelerator activator, a methyl trialkyl ammonium salt of the formula:

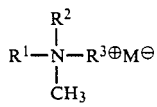

wherein $R^1$, $R^2$, and $R^3$ are independently alkyl radicals having 8 to 10 carbon atoms and M is selected from the group consisting of Cl, Br, $CH_3SO_4$ and $HSO_4$. Preferably, M is Cl or $CH_3SO_4$. The amount of methyl trialkyl ammonium salt that is used generally ranges from about 0.5 to about 1.0 phr. Preferably, the amount ranges from about 0.075 to about 0.50 phr with a range of from about 0.10 to about 0.30 phr being particularly preferred. A preferred methyl trialkyl ammonium salt is methyl trialkyl($C_8$-$C_{10}$) ammonium chloride which is commercially available under the trademark Adogen ® 464 from Sherex Chemical Company of Dublin, Ohio and from Henkel Corporation, Minneapolis, Minnesota, under the trademark Aliquot ® 336. Methyl trialkyl ammonium salts are generally known as a phase-transfer catalysts and are described in U.S. Pat. No. 3,992,432 which is incorporated by reference in its entirety.

For ease in handling, the methyl trialkyl ammonium salt may be deposited on suitable carriers. Examples of carriers which may be used in the present invention include silica, carbon black, alumina, kieselguhr, silica gel and calcium silicate.

The cure system of the present invention includes N-cyclohexylthio-phthalimide. The N-cyclohexylthi-ophthalimide acts as a prevulcanization inhibitor and is generally used in an amount ranging from about 0.05 to about 0.50 phr. A range of from about 0.10 to about 0.30 phr is preferred. The N-cyclohexylthio-phthalimide inhibits the accelerators' activity during processing and storage and assists in preventing scorch during processing and prevulcanization during storage.

An additional component of the cure system of the present invention is zinc oxide or zinc stearate. Preferably zinc oxide is used. Zinc oxide or zinc stearate is generally used in an amount ranging from about 1.0 to about 5.0 phr. Preferably the zinc oxide or zinc stearate is used in an amount ranging from about 2.0 to 4.0 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymer polysulfide or sulfur olefin adducts. Preferably, the sulfur vulcanizing agent is elemental sulfur. Generally speaking the amount of sulfur vulcanizing agent ranges from about 0.75 to about 3.0 phr. Preferably, the amount of sulfur vulcanizing agent ranges from about 1.0 to about 2.0 phr.

It is to be understood that other normal compounding ingredients can be mixed with the rubber such as carbon black, rubber processing oils, antidegradants, as well as other pigments.

The present invention may be used to cure any sulfur vulcanizable rubber or elastomer or blends of such rubbers containing olefinic unsaturation. The phrase "rubber or elastomer containing olefinic unsaturation" is intended to include both natural rubber and its various raw and reclaim forms as well as various synthetic rubbers. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR, methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, copolymers of 1,3-butadiene or isoprene with monomers such as styrene, acrylonitrile and methyl methacrylate, as well as ethylene/propylene terpolymers, also known as EPDM, and in particular, ethylene/propylene/ dicyclopentadiene terpolymers. The preferred elastomers or rubbers for this invention include 1,4-polyisoprene, polybutadiene and styrene-butadiene copolymers.

The sulfur vulcanizable rubber composition containing the cure system elastomer is particularly advantageous because it has been observed to provide a very fast cure rate without prematurely curing during injection molding. The sulfur vulcanizable rubber composition may be injection molded under a variety of conditions depending on the equipment used and proportions of each component in the rubber. For example the sulfur vulcanizable composition can be injection molded at a linear speed of up to 10 inches per second, however, as can be appreciated by those skilled in the art, such linear speed depends on the type of equipment used.

The sulfur vulcanizable composition containing the cure system of the present invention is particularly suited for injection molding and generally has a plasticity of 35 or less as measured in accordance with ASTM No. D1646. Preferably, the plasticity of the material will range from about 25 to about 34 with a range of from about 27 to about 33 being particularly preferred.

The sulfur vulcanizable compositions may be injection molded into a variety of products. For example, one may injection mold the sulfur vulcanizable materials into tire treads, bladders, pads, bumpers, shoe soling, O-rings, bearing seals, milking machine inflators, pipe gaskets, bushings, grommets, tubeless tire valves, snowmobile bogey wheels, golf club grips.

The following examples further illustrate the practice of the invention and the parts are by weight unless otherwise noted.

EXAMPLES 1-6

Rubber compounds were prepared by mixing the various ingredients which comprised the materials identified in the following Table I. The composition listed in Table I for Stage 1 was used for Examples 1-6.

TABLE I

| Material | Parts |
|---|---|
| Stage 1 | Examples 1-6 |
| Styrene-butadiene rubber | 50 |
| Cis-1,4-polybutadiene | 50 |
| Carbon black | 64.5 |
| Processing oils | 31.5 |
| Wax | 1.0 |
| Antioxidant | 1.25 |
| Zinc oxide | 3.0 |
| | Example |

TABLE I-continued

| Material | Parts | | | | | |
|---|---|---|---|---|---|---|
| Stage 2 | 1 | 2 | 3 | 4 | 5 | 6 |
| N—oxydiethylene-thiocarbamyl-N'—oxydiethylene sulfenamide | 1.0 | 1.0 | — | — | — | — |
| Tetramethyl thiuram disulfide | .35 | .35 | .35 | .35 | .35 | .35 |
| N—cyclohexyl-2-benzothiazole sulfenamide | .60 | 1.5 | — | — | — | — |
| Dithiodimorpholine | — | 1.0 | 1.0 | 1.0 | — | — |
| Diphenylguanidine | — | — | .60 | .60 | .60 | .60 |
| Trialkyl (C-8 to 10) methyl ammonium chloride | — | — | — | .30 | .25 | .30 |
| N—oxydiethylene-2-benzothiazole sulfenamide | — | — | — | — | .90 | .90 |
| Mercaptobenzothiazyl disulfide | — | — | — | — | .10 | .10 |
| N—cyclohexylthio-phthalimide | — | — | — | — | — | .10 |
| Sulfur | 1.8 | 1.0 | 1.5 | 1.5 | 1.5 | 1.5 |

The rubber compounds were mixed in a Banbury in two stages. The first stage was mixed at a temperature of up to about 340° F. after which the compounds were sheeted out and cooled. The sheeted stocks were then mixed in a second stage at a temperature of up to about 220° F. and sheeted out and cooled. No scorching of the compounded rubbers was observed during or after the two stage mixing process. Samples of the compounded rubber of Examples 1-6 were taken and evaluated for plasticity according to ASTM No. D1646. The plasticities of the compounded rubbers are given by Mooney Small (rotor) measurements after 1 minute preheat followed by 1½ minute run at 100° C., and are given in Table II.

The compounded rubber mixtures of Examples 1-6 were tested for cure properties by oscillating disc rheometer according to ASTM D2084. The results are given in Table II. Additionally, cured physical properties for Examples 1 and 6 were determined and are also given in Table II.

Finally, these compounds were each placed, in turn, in a Desma Type 966 injection molding machine. The rubber compounds were forced under conditions of pressure to flow into a suitable mold, namely, a ring-shaped mold in the shape of a tire tread in which the outer periphery of the mold contained a tread design. The treads so formed are suitable for retreading a tire of size 11R24.5 and weight, after cure, approximately 34 pounds. The rubbers in the mold were cured using a mold temperature of about 360° F. for progressively shortened times after which the mold was opened and the tread rings removed. The freshly cured treads were sectioned to observe porosity arising from insufficient state of cure. The shortest press cure times which gave fully cured, non-porous treads were chosen as the optimum injection cure times. These injection cure times are given for Examples 1-6 in Table III.

The tread rings were then fitted to a toroidal tire carcass to form a retreaded tire.

TABLE II

| | Example[1] | | | | | |
|---|---|---|---|---|---|---|
| | 1 | 2 | 3 | 4 | 5 | 6 |
| Plasticity[2] | | | | | | |
| MS1 + 1½ @ 100° C. | 28 | 27 | 30 | 30 | 31 | 33 |
| Rheometer, 150° C., 1° arc, 100 cpm[3] | | | | | | |

TABLE II-continued

| | Example[1] | | | | | |
|---|---|---|---|---|---|---|
| | 1 | 2 | 3 | 4 | 5 | 6 |
| max. torque, dN · m | 47 | 43 | 42 | 42.5 | 43 | 42.5 |
| min. torque, dN · m | 6.0 | 6.0 | 6.5 | 7.0 | 9.0 | 9.3 |
| t1, min. | 6.0 | 5.0 | 3.8 | 3.3 | 2.0 | 1.8 |
| t2, min. | 6.5 | 5.7 | 4.2 | 3.5 | 2.3 | 2.0 |
| t5, min. | 7.0 | 6.4 | 4.8 | 4.0 | 2.7 | 2.3 |
| t'25, min. | 7.8 | 7.0 | 5.0 | 4.3 | 3.0 | 2.6 |
| t'90, min. | 11.0 | 10.0 | 8.0 | 7.2 | 5.0 | 4.5 |
| rate[5], dN · m/min. | 6.6 | 8.0 | 8.0 | 9.1 | 12.0 | 14.0 |
| Stress-strain[4] | | | | | | |
| 300% modulus, MPa | 11.9 | — | — | — | — | 12.6 |
| Ultimate tensile, MPa | 16.0 | — | — | — | — | 14.0 |
| Elongation-at-break, % | 390 | — | — | — | — | 330 |
| Shore A hardness | 65 | — | — | — | — | 65 |

[1]Examples 1-6 from Table I.
[2]ASTM D1646
[3]ASTM D2084
[4]ASTM D412
[5]Cure rate defined as:
$$\frac{\text{Torque at } t'90 - \text{Torque at } t'25}{t'90 - t'25} \text{ in dN} \cdot \text{m/min.}$$

TABLE III

| | Example | | | | | |
|---|---|---|---|---|---|---|
| | 1 | 2 | 3 | 4 | 5 | 6 |
| Minimum injection cure time, min.[1] | 7.0 | 6.0 | 4.6 | 3.0 | 2.0 | 1.5 |

[1]Desma type 966 injection molding machine at 360° F., 11R24.5 size treads.

The significance of the cure system of the present invention is shown in the dramatic reduction in injection cure time achieved in going from a conventional cure system in Example 1 to the optimum system of the present invention in Example 6. With the cure system of Example 6, a 34 pound tread is produced in a 1.5 minute cure with safe processing and good ultimate cured properties. Sulfur level is optimized in Examples 3–6 as is choice and level of sulfenamide accelerator (N-oxydiethylene-2-benzothiazolesulfenamide) (Examples 5 and 6). Inclusion of both guanidine (diphenylguanidine) and thiuram (tetramethyl thiuram disulfide) accelerators is demonstrated (Examples 3–6). The advantage of using mercaptobenzothiazyl disulfide is demonstrated in Examples 5 and 6. The advantage of using trialkyl methyl ammonium chloride is demonstrated in Examples 4, 5, and 6. The level of trialkyl methyl ammonium chloride is optimized in Example 6, along with the addition of N-cyclohexylthiophthalimide, to give the best balance of process safety and exceptionally fast cure rate.

EXAMPLES 7–8

The following examples demonstrate the requirement of the preparation of the compounded rubber with the desired plasticity for injection, as well as the application to an alternate polymer blend system.

The rubber compounds were prepared by mixing in a Banbury the various ingredients identified in Table IV. The composition of Example 7 was mixed in five stages as shown in Table IV. A final plasticity of 38 was achieved (ASTM D1646). The cure system of Example 7 was based in part on the optimum system developed in Example 6. The rubber composition of Example 8 was mixed in three stages as shown in Table IV. Stage 1 involved addition and mixing of all polymers, black and oils to a temperature of about 340° F. Stage 2 involved addition and mixing of silica to about 310° F. Stage 3 involved addition and mixing of curatives and antidegradants to about 220° F. A final plasticity of 28 was achieved. The cure system of Example 8 was developed with full implementation of the cure system of the present invention. Sulfenamide (N-oxydiethylene-benzothiazole-2-sulfenamide) and mercaptobenzothiazyl disulfide were added to the existing sulfur, zinc, guanidine (diphenyl guanidine), thiuram (tetramethyl thiuramdisulfide), trialkyl (C-8 to 10) methyl ammonium chloride, and N-cyclohexylthiophthalimide, whose levels were adjusted for optimum blend of cure rate, process safety, and ultimate cured physical properties.

The compounded rubbers of Examples 7 and 8 were tested for cure properties by oscillating disc rheometer according to ASTM D2084. The results are given in Table V. Cured physical properties were also obtained and are given in Table V.

Both compounded rubbers were evaluated in a Desma Type 966 injection molding machine. The rubber of Example 7 could not be safely processed. Due to its high plasticity, the stock partially scorched in the runner system. Resulting treads required 4.5 minutes "cure" time but always contained flaws due to scorch from improper flow. The rubber of Example 8 processed without problem. No scorch was observed due to the low plasticity. This is in spite of the much faster cure rate and reduced process safety of the rubber, as measured by t1, t2, etc. on the rheometer. The compounded rubber of Example 8 produced flawless treads in an optimum injection cure time of 3.0 minutes.

TABLE IV

| Material | Example 7, Parts Stage | | | | | Example 8, Parts Stage | | |
|---|---|---|---|---|---|---|---|---|
| | 1 | 2 | 3 | 4 | 5 | 1 | 2 | 3 |
| | | | Remill | Remill | | | | |
| Natural rubber | 85 | — | — | — | — | 85 | — | — |
| Cis-1,4-polybutadiene | — | 15 | — | — | — | 15 | — | — |
| Carbon black | 20 | 30 | — | — | — | 40 | — | — |
| Processing aid | 2.0 | 10 | — | — | — | 12 | — | — |

TABLE IV-continued

| Material | Example 7, Parts Stage | | | | | Example 8, Parts Stage | | |
|---|---|---|---|---|---|---|---|---|
| | 1 | 2 | 3 | 4 | 5 | 1 | 2 | 3 |
| Silica | — | — | — | — | — | — | 10 | — |
| Waxes | — | 1.5 | — | — | 1.0 | 0.4 | — | 3.0 |
| Antidegradants | — | 2.0 | — | — | — | — | — | — |
| Zinc oxide | — | 4.0 | — | — | — | 4.0 | — | — |
| Peptizer | 0.1 | — | — | — | — | 0.2 | — | — |
| Stearic acid | — | 2.0 | — | — | — | 2.0 | — | — |
| Sulfur | — | — | — | — | 1.5 | — | — | 1.5 |
| Dithiodimorpholine | — | — | — | — | 1.0 | — | — | — |
| Diphenylguanidine | — | — | — | — | 0.60 | — | — | 0.40 |
| Tetramethylthiuram disulfide | — | — | — | — | 0.35 | — | — | 0.30 |
| Trialkyl(C8 to 10) methyl ammonium chloride | — | — | — | — | 0.30 | — | — | 0.21 |
| N—cyclohexylthiophthalimide | — | — | — | — | 0.20 | — | — | 0.20 |
| N—oxydiethylene-benzothiazole-2-sulfenamide | — | — | — | — | — | — | — | 0.90 |
| Mercaptobenzothiazyl disulfide | — | — | — | — | — | — | — | 0.10 |

TABLE V

| | Example[1] | |
|---|---|---|
| | 7 | 8 |
| Plasticity[2] | | |
| MS1 + 1½, 100° C. | 38 | 28 |
| Rheometer, 150° C., 1° arc, 100 cpm[3] | | |
| max torque, dN · m | 39 | 42 |
| min torque, dN · m | 6.0 | 7.0 |
| t1, min. | 6.0 | 2.0 |
| t2, min. | 7.0 | 2.5 |
| t5, min. | 8.3 | 2.8 |
| t'25, min. | 9.0 | 3.4 |
| t'90, min. | 13.0 | 4.8 |
| rate[5] | 5.1 | 17.0 |
| Stress-Strain[4] | | |
| 300% modulus, MPa | 9.0 | 11.9 |
| Ultimate tensile, MPa | 22.0 | 21.5 |
| Elongation-at-break, % | 580 | 465 |
| Shore A hardness | 65 | 65 |

[1]Examples 7-8 from Table IV
[2]ASTM D1646
[3]ASTM D2084
[4]ASTM D412
[5]Cure rate as defined in Table II The instant invention has been found to provide a suitable cure system to enable an elastomer or blend of elastomers to be molded under injection molding conditions. Other benefits derived from the use of the materials and method of this invention will be obvious to those having ordinary skill in the art.

What is claimed is:

1. A sulfur vulcanizable rubber composition comprising:
   (a) an elastomer containing olefinic unsaturation and selected from the group consisting of natural rubber, neoprene, polyisoprene, butyl rubber, polybutadiene, styrene-butadiene copolymer, isoprene-styrene copolymer, methyl methacrylate-isoprene copolymer, acrylonitrile-isoprene copolymer, acrylonitrile-butadiene copolymer, EPDM or mixtures thereof;
   (b) from about 0.50 to about 2.0 phr of a sulfenamide accelerator selected from the group consisting of N-oxydiethylene benzothiazole-2 sulfenamide, N-cyclohexyl-2-benzothiazole sulfenamide, N-t-butyl-2-benzothiazole sulfenamide and N-oxydiethylene-thiocarbamyl-N'-oxydiethylene sulfenamide;
   (c) from about 0.10 to about 1.0 phr of a guanidine accelerator selected from the group consisting of diphenyl guanidine and di-ortho-tolylguanidine;
   (d) from about 0.05 to about 1.0 phr of mercaptobenzothiazyl disulfide;
   (e) from about 0.10 to about 1.0 phr of a thiuram accelerator selected from the group consisting of tetraethyl thiuramdisulfide, tetramethyl thiuram monosulfide, tetramethyl thiuramdisulfide;
   (f) from about 0.75 to about 3.0 phr of a sulfur vulcanizing agent;
   (g) from about 0.05 to about 0.50 phr of N-cyclohexylthio-phthalimide;
   (h) from about 1.0 to about 5.0 phr of a zinc compound selected from the group consisting of zinc oxide and zinc stearate; and
   (i) from about 0.05 to about 1.0 phr of an activator of the formula:

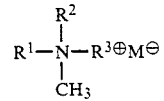

wherein $R^1$, $R^2$, and $R^3$ are independently alkyl radicals having 8 to 10 carbon atoms and M is selected from the group consisting of Cl, Br, $CH_3SO_4$ and $HSO_4$; and wherein the sulfur vulcanizable rubber has a plasticity of 35 or less.

2. The sulfur vulcanizable rubber composition of claim 1 wherein said elastomer is polyisoprene, polybutadiene, styrene-butadiene copolymer or mixtures thereof.

3. The sulfur vulcanizable rubber composition of claim 1 wherein the sulfenamide accelerator is N-oxydiethylenebenzothiazole-2 sulfenamide.

4. The sulfur vulcanizable rubber composition of claim 1 wherein the guanidine accelerator is diphenyl guanidine.

5. The sulfur vulcanizable rubber composition of claim 1 wherein the thiuram accelerator is tetramethyl thiuramdisulfide.

6. The sulfur vulcanizable rubber composition of claim 1 wherein the sulfur vulcanization agent is elemental sulfur.

7. The sulfur vulcanizable rubber composition of claim 1 wherein the zinc compound is zinc oxide.

8. The sulfur vulcanizable rubber composition of claim 1 wherein M is Cl or $CH_3SO_4$.

9. The sulfur vulcanizable rubber composition of claim 1 wherein the plasticity ranges from about 25 to 34.

10. The sulfur vulcanizable rubber composition of claim 9 wherein the plasticity ranges from about 27 to 33.

* * * * *